Figure 3:
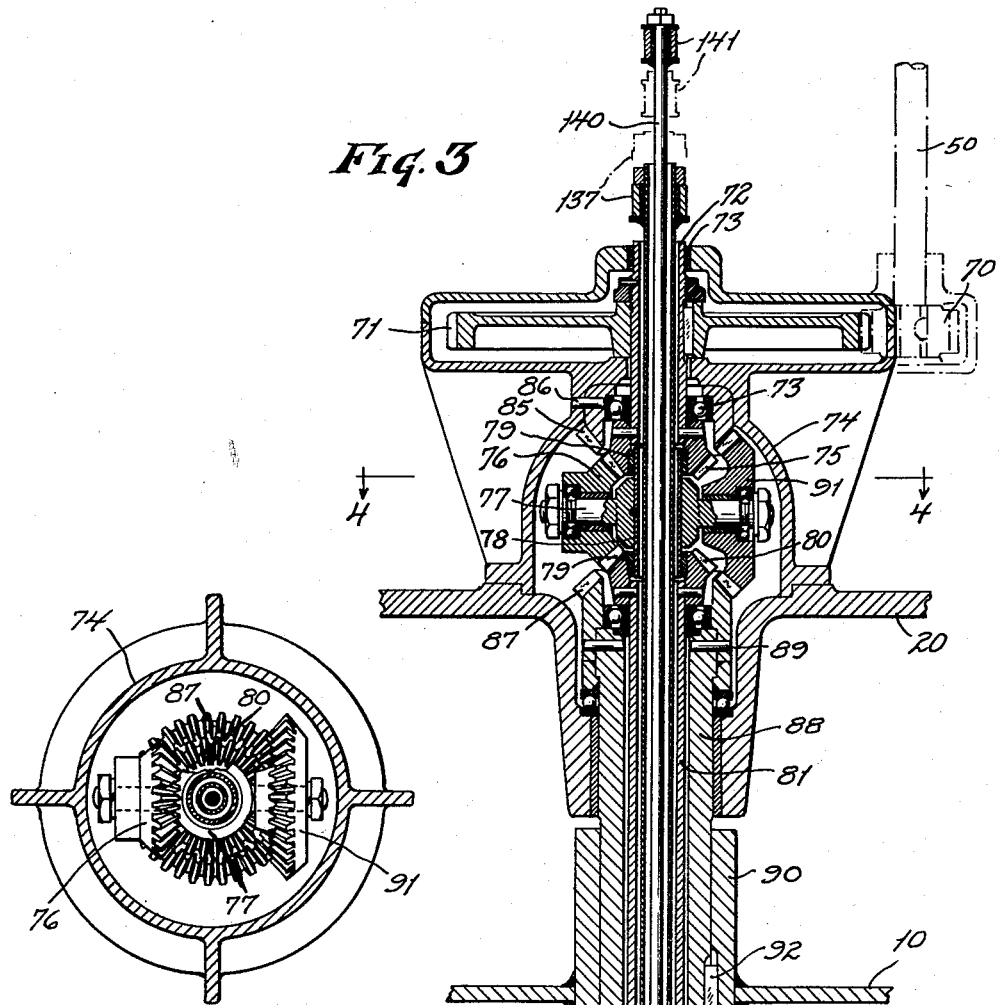

May 28, 1940.  S. K. TOWSON  2,202,676
VEHICULAR STEERING MECHANISM
Filed July 27, 1938   3 Sheets-Sheet 1
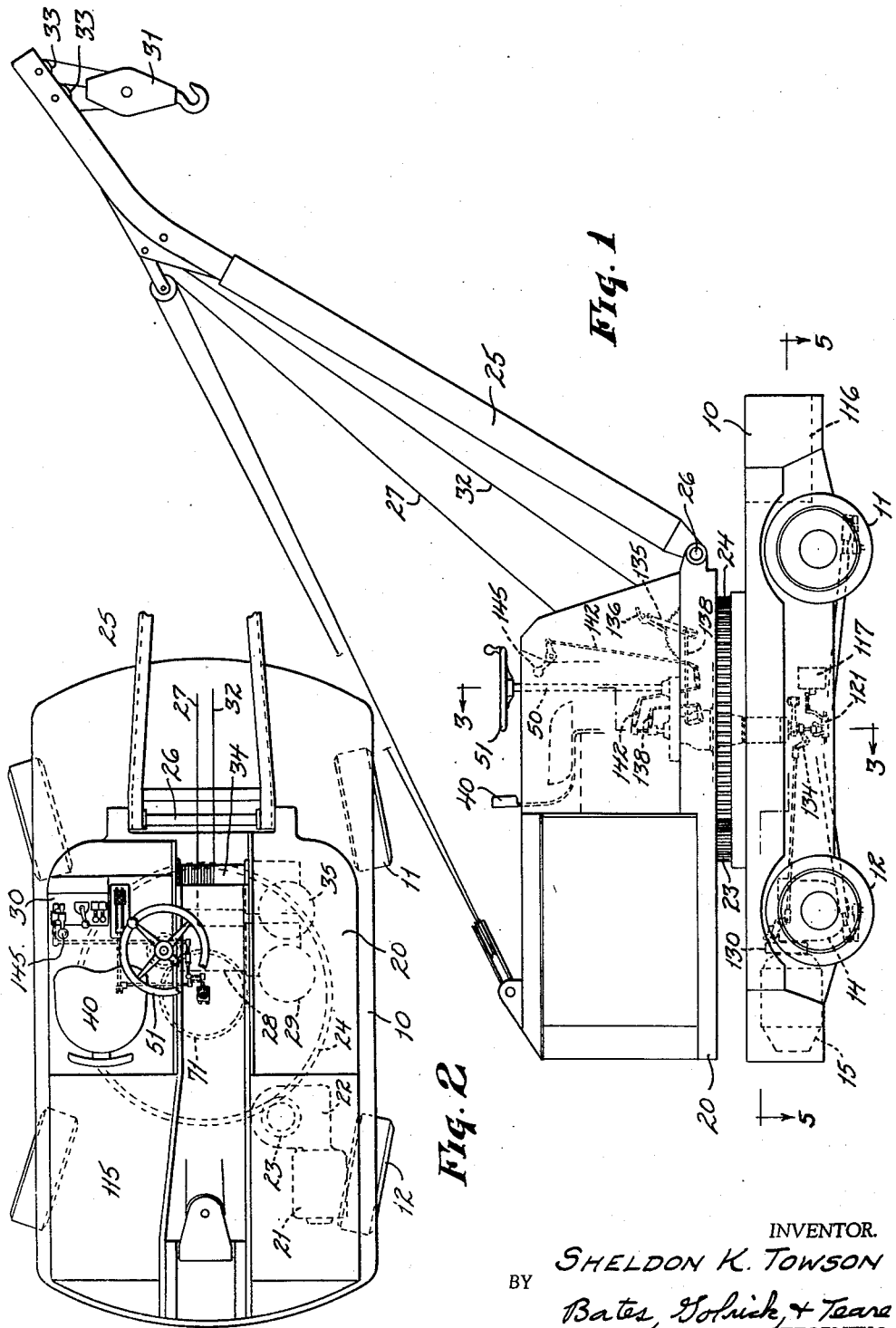
INVENTOR.
SHELDON K. TOWSON
BY Bates, Golrick, + Teare
ATTORNEYS May 28, 1940.　　　S. K. TOWSON　　　2,202,676
VEHICULAR STEERING MECHANISM
Filed July 27, 1938　　　3 Sheets-Sheet 2

INVENTOR.
SHELDON K. TOWSON
BY Bates, Goldrick, & Teare
ATTORNEYS

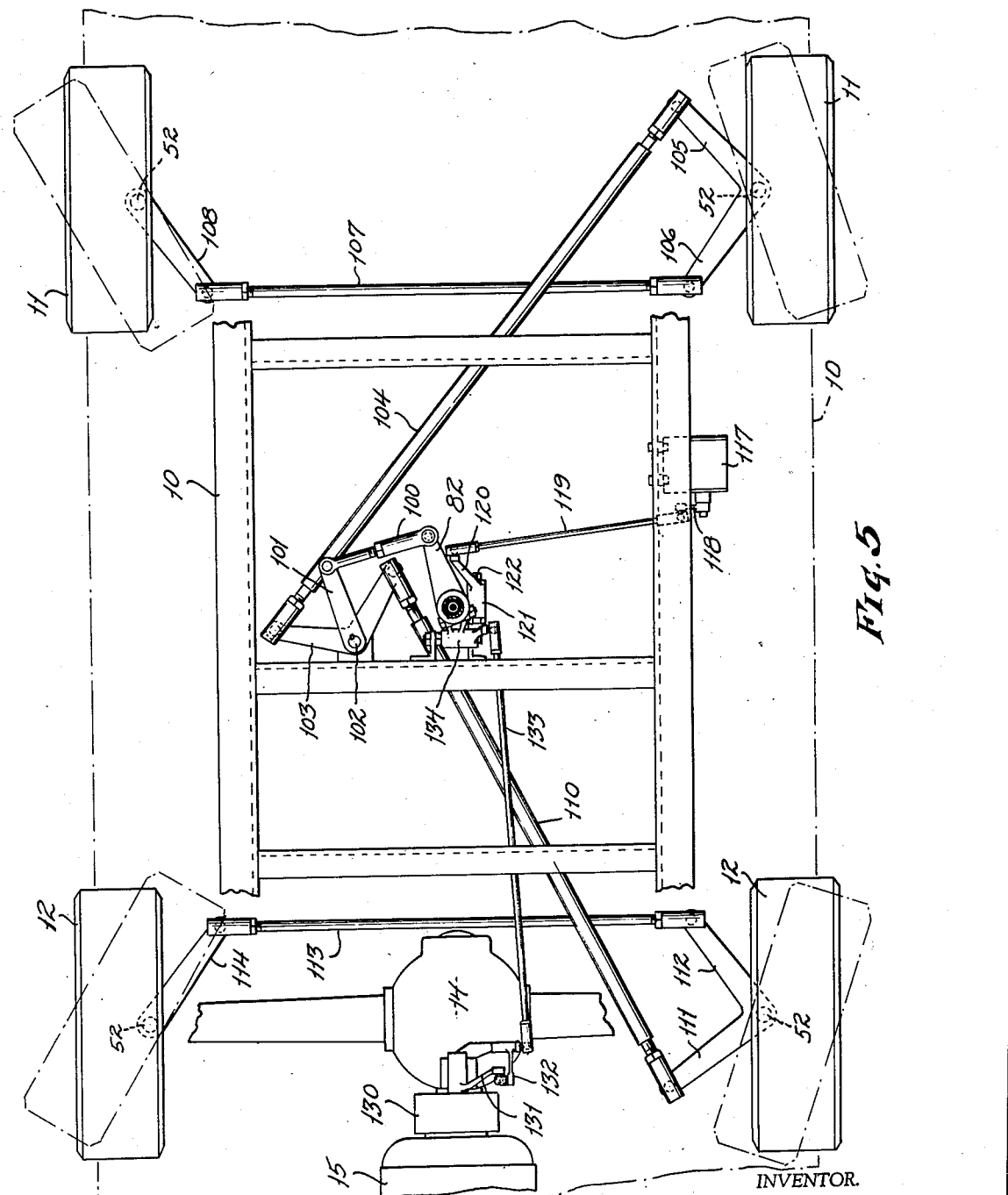

Patented May 28, 1940

2,202,676

UNITED STATES PATENT OFFICE 2,202,676

VEHICULAR STEERING MECHANISM

Sheldon K. Towson, Cleveland Heights, Ohio, assignor to The Elwell-Parker Electric Company, Cleveland, Ohio, a corporation of Ohio Application July 27, 1938, Serial No. 221,541

8 Claims. (Cl. 280—96)

This invention relates to an industrial truck, and especially to a power-driven industrial truck mounted on steerable wheels, and having a turn-table which carries the load-engaging unit. More particularly, the present invention is concerned with the provision of an improved steering mechanism for such a truck.

Industrial trucks in the class in which this invention is especially concerned, are used to move various types of loads from place to place in industrial establishments. Such class of trucks includes low-lift trucks of the general types shown in Patent No. 1,804,047, issued to my assignee, The Elwell-Parker Electric Company, the 5th day of May, 1931; tier-lift trucks, such as that shown in Patent No. 1,738,272, issued to my assignee on December 3rd, 1929; and crane trucks, of the type generally disclosed in Patent No. 1,519,117, issued to my assignee the 16th day of December, 1924.

In general, all of these trucks comprise a frame supported by power-driven wheels, certain of which are driven by a motor or motors carried by the frame. Each truck is provided with a load-handling or raising mechanism, as, for instance, a low platform, which is insertable beneath a skid to raise a load from the truck-supporting surface a distance sufficient to enable the transportation of the load from place to place. Other trucks are provided with a platform or wedge projecting beneath the load and raisable to lift the load and deposit it on top of another load, called "steering". Again, the load-handling apparatus may include a crane, which engages the load with a hook or sling, lifting the load in the usual manner. Industrial trucks are also provided with many other types of load-engaging and handling mechanisms, not specifically mentioned here, but which are more or less adapted for handling special loads or handling loads in special ways, as, for instance, for handling rolls of paper, coils of wire and various other articles.

Industrial trucks, such as above described, have been placed in extensive use in industrial establishments. Special attention has been paid to ways and means to enable the turning of such trucks in a comparatively short area. For instance, all of the truck-supporting wheels have been made steerable to permit the truck to be turned sharply, and thus reduce the floor space required for the turning of the truck. In some instances, however, the dirigibility of the truck-supporting wheels has been insufficient to provide the manouverability required or desired for load-handling requirements. This has been found especially true in connection with those industrial trucks where the load-lifting mechanism comprised a crane. To increase the load-handling ability of crane trucks, the cranes have been mounted on a turn-table, carried by the truck frame, thus enabling the load to be swung independent of the turning of the truck frame on the truck supporting surface. An example of such a truck is best shown in Patent No. 1,519,117, above mentioned.

The mounting of the crane or load-handling mechanism on a turn-table has had several disadvantages. For instance, the truck frame had to be lengthened to provide sufficient space for the truck controls at one end of the truck frame. Likewise, the counter-balancing effect of the weight of the operator and control mechanism, to a great extent, has been lost. Furthermore, when the load-lifting unit was mounted on a turn-table, the control or steering of the truck, as well as the control of the load-handling mechanism, have become difficult, due to the distance between the operator's position and the load-handling mechanism, which distance has often been increased by the mounting of counter-weights on the turn-table. Therefore, the general object of this invention is to provide a turn-table type of industrial truck which will overcome these disadvantages.

The disadvantages of turn-table types of industrial trucks, including those above mentioned, have, to a great extent, been caused by difficulties encountered in the controlling or steering of the dirigible wheels from the turn-table. Hence, a more specific object of the invention is to provide an improved steering mechanism for a turn-table type of industrial truck, which will facilitate the control of the steering of dirigible truck-supporting wheels from an operator's position on the turn-table.

Another important object of this invention is to provide a turn-table type of industrial truck with a steering mechanism, the control for which is mounted on the turn-table adjacent an operator's position carried by such turn-table, and which steering mechanism will be so arranged that the control therefor will not be affected by the movement of the turn-table relative to the truck frame; thus facilitating simultaneous operation of the steering and load-handling mechanism by the operator, and resulting in efficient and economical operation of the truck.

A more specific object of this invention is to provide an industrial truck having power-actuated and steerable supporting wheels, with a turn-table carrying a load-engaging member having an operator's position thereon, and a steering member carried thereby, together with a mechanism which may be interposed between the steering member carried by the turn-table and the dirigible wheels, to permit the slewing or rotary movement of the turn-table, relative to the truck frame, without moving the steering member relative to the operator.

Other objects and advantages of this invention will become more apparent from the following specification and accompanying drawings, which describe and illustrate one form of the invention. The novel and essential features of the invention will be summarized in the claims.

Figure 4:
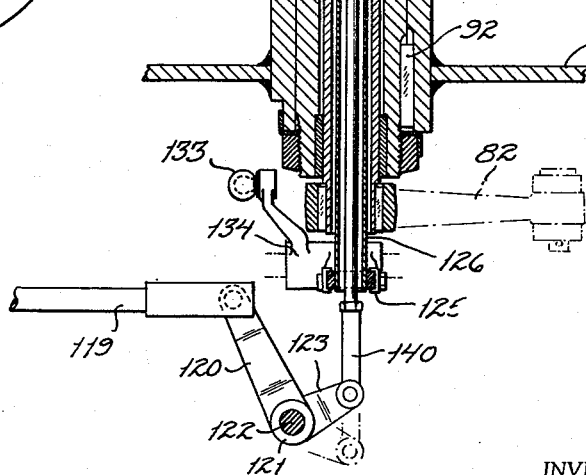

In the drawings, Fig. 1 is a side elevation of a turn-table industrial truck embodying my invention; Fig. 2 is a plan view of the truck shown in Fig. 1; Fig. 3 is a vertical section, as indicated by the line 3—3 on Fig. 1, illustrating the mechanism which is interposed between the steering member and the dirigible truck-supporting wheels; Fig. 4 is a sectional detail, as indicated by the line 4—4 on Fig. 3; Fig. 5 is a horizontal section, as indicated by the line 5—5 on Fig. 1, certain parts being broken away to more clearly illustrate the link inter-connecting the steering mechanism with the dirigible wheels.

Referring again to the drawings, and especially to Figs. 1 and 2, the truck comprises a main frame 10, supported by two pairs of dirigible wheels 11 and 12. At least one pair of these wheels, for instance, the wheels 12, are power-driven wheels, being connected by a differential unit 14, with a driving motor 15. Inasmuch as driving connections to dirigible wheels are well known at the present time, the details of such connection have been omitted from the drawings.

Rotatably mounted on the truck frame, in any well known manner, is a turn-table 20. Suffice it to say that this turn-table is arranged to rotate relative to the main truck frame in a horizontal plane. The turn-table is rotated relative to the truck frame by a motor 21, which, through suitable reducible gearing, such as that indicated at 22 as driving a pinion 23, which meshes with a gear ring 24, stationarily mounted on the main frame 10.

The load-handling mechanism may comprise any type desired. However, a crane type load-handling mechanism is illustrated in the drawings. As indicated in Fig. 1, a boom 25 is pivotally mounted as at 26 to the turn-table 20, and is arranged to be swung about its pivot by a cable 27, which is inter-connected between the load and a winding drum 28 in the usual manner. The drum 28 is operated by a motor 29 through suitable gearing, not shown, and may be controlled from electric switches, carried by a control panel 30. As shown, the boom supports the usual hook 31, which is raised and lowered by a cable 32, reeved about suitable sheaves 33 and reeled by a winding drum 34. The drum 34 is driven by a motor 35 through suitable gearing, not shown.

The operator's position is on the turn-table. As shown in the drawings, a seat 40 is mounted on the turn-table. Adjacent this seat is the control panel 30, which carries the switch or control levers for operating the four motors, heretofore mentioned. Mounted on a vertically extending shaft 50, carried by the turn-table adjacent the operator's position, is a steering wheel 51, by means of which the dirigible wheels are swung about their pivots 52. To turn or swing the truck-supporting wheels, this steering wheel is connected with the linkage, hereinafter to be described, but carried by the truck frame 10, and connected to the supporting wheels. It is obvious that as the turn-table 20 rotates relative to the truck frame, were the steering wheel carried by the truck frame, the operator would be swung around the steering wheel, causing relative movement between the operator and the steering wheel, making the steering of the truck difficult. Again, were the steering wheel supported by the turn-table and connected to the supporting wheels in the usual manner, the rotation of the turn-table would result in the rotation of the steering wheel despite the fact that the supporting wheels were not moved about their pivots. This too would make the steering of the truck difficult. Then too, as is true of most trucks of this type, it is desirable to insert a gear reduction unit between the steering wheel and the steering links, so as to enable the steering wheel to be readily turned, even though the truck supports a comparatively heavy load, as well as when the truck is stationary or operating at comparatively low running speeds. This, of course, would normally increase the relative movement between the operator and the steering wheel, whenever the turn-table was swung about its pivot, and further hamper the steering of the truck from the turn-table.

This invention is especially concerned with a mechanism to be interposed between the steering wheel 51 and the wheels 11 and 12, to facilitate the steering of the truck and at the same time permit the steering wheel to remain stationary relative to the operator while the turn-table is being swung relative to the main frame of the truck, and to so arrange such mechanism that the steering wheel may be operated to turn the truck-supporting wheels 11 and 12 about their pivots while the turn-table is being swung in the same manner as when the turn-table is stationary.

Figs. 3 and 4 illustrate the mechanism which connects the steering wheel and column 50 with the linkage, hereinafter to be described, but which linkage is carried by the main frame 10 and is actuated by such mechanism to swing the dirigible load-supporting wheels about their pivots.

As shown in Fig. 3, a pinion 70 is secured to the lower end of the steering column 50. This pinion meshes with a gear 71, secured to a sleeve 72, journalled in bearings 73, carried by a housing 74. The housing 74 is secured to the turn-table 20 by any suitable means, not shown. Drivingly secured to the lower end of the sleeve 72 is a bevelled gear 75, arranged to mesh with a bevelled gear 76, which, in turn, meshes with a bevelled gear 80, hereinafter more fully described. The gear 76 is rotatably carried by a spider 77, which is drivingly secured to a sleeve 78. This sleeve 78 is rotatably journalled in bushings 79 carried by the gears 75 and 80. The gear 80 is drivingly secured to an elongated sleeve 81, which passes downwardly and is journalled in aligned openings in the turn-table 20 and the main frame 10. A lever 82 is secured to the lower end of the sleeve 81. This lever is connected by links, hereinafter more fully described, with the dirigible load-supporting wheel or wheels. Thus it will be seen that when the steering wheel 51 is rotated, the gear 70 will rotate the gear 71, and the bevelled pinion 75 as a unit. Under normal conditions, that is, when the turn-table is stationary relative to the main frame 10, the spider 77 is held stationary, as will hereinafter be more fully described. Hence, the rotation of the bevelled gear 75 rotates the bevelled gear 80, causing the lever 82 to be swung in the desired direction to operate or swing the dirigible wheels about their pivots.

When there is no relative movement between the turn-table 20 and the main frame 10 of the truck, the spider 77 is likewise held stationary, as heretofore mentioned. This is accomplished by a gear 85, which is secured by a pin 86 to the housing 74, heretofore mentioned as being fixed to the turn-table 20. A second gear 87, stationary relative to the main frame, is similarly secured to a hollow sleeve 88, by a pin 89. The sleeve 88, as shown in Fig. 3, encircles the sleeve 81, heretofore mentioned, and is secured at its lower end, as, for instance, by a pin 92, to a bushing 90, which is welded or otherwise fixed to the main frame 10. Thus, it will be seen that the gear 85 remains at all times rigid with the turn-table, whereas the gear 87 remains at all times rigid with the frame 10. Rotatably mounted on the spider 77 is a bevelled gear 91, which meshingly engages both the gear 87 and the gear 85. Thus, when there is no relative movement between the turn-table and the main frame, the gear 91 will prevent relative movement between the spider and the turn-table or the main frame, thus enabling the driving connection between the steering column and wheel 51 and the link 82 to be made as heretofore described.

When, however, the turn-table 20 is rotated relative to the main frame 10, the engagement of the bevelled gear 91 with the turn-table gear 85 and the frame-gear 87, will cause the spider 77 to rotate about the axis of the gear 71. This movement of the spider causes the bevelled gear 76 carried thereby to roll on the bevelled gear 80 and compensate for the movement of the gear 75, which moves bodily with the turn-table. Therefore, the steering wheel normally remains fixed relative to the turn-table.

The arrangement is such that the steering wheel may be operated to move the link 82 and thus swing the load-supporting wheels about their pivots, while the turn-table is being swung relative to the main frame 10. Under such conditions, the movement of the steering wheel by the operator causes the bevelled gear 75 to be moved relative to the turn-table, thereby thus increasing or decreasing the angular distance of rotation of the pinion 76 about its horizontal axis relative to that of the pinion 91. The weight of the turn-table and main frame being so much greater than the force applied by the operator to the steering column, the difference of angular movement between the pinion 76 and the pinion 91 is transmitted by the pinion 76, to the bevelled gear 80, heretofore described, thus swinging the steering lever 82, thereby permitting the dirigible wheel to be swung in the usual manner, regardless of the fact that the turn-table may be at the same time moving relative to the main frame.

The relationships of the various bevelled gears and the spider, as above described, are such that a given displacement of the steering wheel relative to the crane and operator, thus causing a given angular displacement of the gear 75 relative to the gear 85, produces that same angular displacement of the gear 80 relative to the gear 87, and hence a given amount of turning of the vehicle-supporting wheels, regardless of the angular position or movement of the turn-table relative to the base.

When the turn-table is being revolved, and the steering operation carried on simultaneously, the angular movement of the gear 85, with respect to the gear 87, due to the relative movement between the frame and turn-table, causes the idler gear 91 to rotate the spider through an angle equal to one-half of such angular movement. This rotation of the spider produces through the idler gear 76, double its value in angular movement between the gears 75 and 80. The latter are thus given a relative angular displacement, equal to and in the same direction as that of the gears 85 and 87, increased or decreased, of course, by any angular displacement due to the manual operation of the steering wheel. This equality of angular movement operates to negative the effect of the swinging of the turn-table relative to the main frame, because it allows the gear 75 to follow the gear 85 and the turn-table, while the gear 80 remains fixed relative to the gear 87 and the base, the gears 75 and 80 moving relative to the respective gears 85 and 87 only, and then by equal amounts, when the operator moves the gear 75 by the operation of the steering wheel 50.

The steering arm or lever 82, heretofore described as being connected with the dirigible wheels 12 and 11, is best illustrated in Figs. 2, 3 and 5. As there shown, the arm 82 is connected by a link 100 with a lever 101, which is secured to the shaft 102, suitably journalled in the main frame 10. Also secured to the shaft 102 is the bell crank 103, one arm of which is connected by a rod 104 with an arm 105 carried by the steering knuckle of one front wheel 11. Also connected to this steering knuckle is a second arm 106, which is connected by the usual tie rod 107, with the arm 108 of the steering knuckle of the opposite front wheel 11. The other arm of the bell crank 103, heretofore described, is connected by a rod 110 with an arm 111, which is secured to the steering knuckle of one rear wheel 12. The latter steering knuckle is provided with an arm 112, which is connected by a tie rod 113, and with an arm 114 of the steering knuckle of the other rear wheel 12, thus the movement of the steering arm 82 serves to slew all of the dirigible wheels of the vehicle.

As heretofore described, the motors which actuate the crane and rotate the turn-table are carried by the turn-table and are controlled by switches mounted on a control panel 30, carried by the turn-table. These motors are powered by storage batteries, carried in suitable compartments on the turn-table, such as indicated at 115 of Fig. 2. On the other hand, the motor 15, which drives the driving wheels 12 of the vehicle, is carried by the main frame and is powered by storage batteries carried in any suitable location in the main frame, as, for instance, in a compartment indicated at 116 in Fig. 1.

The motor 15 is controlled by a switch 117 secured to the main frame, as shown in Fig. 5. This switch may be of any type desired, and controls the motor circuits directly or through the medium of secondary circuits and the usual relays. As shown, the switch 117 is provided with an operating arm or lever 118, which is connected by a link 119 with one arm 120 of a bell crank 121. This bell crank is pivotally mounted on a horizontal shaft 122 carried by the main frame and has an arm 123 which is pivotally connected to the lower end of a rod 140, which passes upwardly through a hollow sleeve 126, which extends upward through the sleeve 81, the gear member 80, the sleeve 78 and the housing 74. At its upper end, the rod 140 is provided with a bushing 141, which is connected by a linkage 142 with a manually operable lever 145 mounted on the control panel 30.

The vehicle braking system comprises a brake generally indicated at 130 as being applied directly to the armature shaft of the motor. This brake is operated by a brake actuated lever 131, which is connected by a bell crank 132 with a link 133. This link, in turn, is connected with a bell crank 134, one arm 125 of which is connected to the sleeve 126, heretofore described. At the upper end of this sleeve, above the housing 74, there is a sleeve 137, which is connected by suitable linkage 138, with a brake lever 135 provided with the usual pedal member 136.

Thus it will be seen that both the brake-operating mechanism and the control mechanism for the propelling motor 15 pass through the compensating mechanism of the steering unit. I find this is very advantageous, as it enables all three mechanisms to be conveniently mounted in alignment with the axis of the rotation of the turntable 20.

While I have described and illustrated my invention in connection with an industrial truck, all wheels of which are dirigible, it is within the scope of my invention to utilize the invention in any type of road or highway vehicle, as, for instance, an automotive truck, a power shovel, and various other vehicular constructions, regardless of whether they are powered by electric motors, steam or internal combustion engines. It is also obvious that it is entirely within the scope of this invention to control the steering of a vehicle in accord therewith, regardless of whether the vehicle is provided with a plurality of wheels, each of which is dirigible and steerable, or with a single steerable wheel, as in the case of a three-wheel vehicle, or, on the other hand, a vehicle wherein steering is accomplished by the usual fifth wheel arrangement.

I claim:

1. In a road vehicle, a main frame, supporting wheels therefor, at least one of said wheels being dirigible, a load-engaging member mounted on said main frame for rotation on a substantially horizontal plane, an operator's platform movable as a unit with said load-engaging member, a steering member carried by said platform, a gear carried by said platform and operably connected with said steering member, a gear carried by said main frame and operably connected with the dirigible wheel to steer the vehicle, a third gear coacting with said first-named gears to transmit the movement of one of such gears to the other of such gears consequent upon the operation of said steering member, a support on which said third gear is mounted, and means to move said support consequent upon relative movement between the platform and the main frame to compensate for such movement, whereby the first and second-named gears may remain fixed relative to the platform and main frame, respectively, during such relative movement.

2. In a road vehicle, a main frame, supporting wheels therefor, at least one of said wheels being dirigible, a load-engaging member mounted on said main frame for rotation in a substantially horizontal plane, an operator's platform movable as a unit with said load-engaging member, a steering controller carried by said platform, a member carried by said platform and operably connected with said controller, a second member carried by said main frame, and operably connected with the dirigible wheel to steer the vehicle, a third member coacting with said first-named members to transmit the movement of one member to the other member consequent upon operation of said controller, a support on which said third member is mounted, means to move said support consequent upon relative movement between the platform and the main frame to compensate for such movement, whereby the first and second named members may remain fixed relative to the platform and main frame, respectively, said last-named means including a gear fixed to said platform, a second gear fixed to said main frame, and a third gear carried by said support and coacting with both of said first-named members.

3. In a road vehicle, a main frame, supporting wheels therefor, at least one of said wheels being dirigible, a load-engaging member mounted on said main frame for rotary movement in a substantially horizontal plane, an operator's platform movable as a unit with said load-engaging member, a steering member carried by said platform, a gear rotatably journalled on said platform and operably connected with said steering member, a second gear rotatably journalled on said main frame and operably connected with the dirigible wheel to steer the vehicle, a third gear coacting with said first-named gears to transmit the movement of one of such gears to the other of such gears consequent upon the operation of said steering member, a movable support on which said third gear is rotatably mounted, and means to move said support consequent upon relative movement between the platform and the main frame to compensate for such movement, whereby the first and second-named gears may remain fixed relative to the platform and main frame, respectively, said means comprising a gear member fixed to said platform, a gear member fixed to said main frame, and a third gear member rotatably mounted on said support and coacting with both of the first-named gear members.

4. In a road vehicle, a main frame, supporting wheels therefor, at least one of said wheels being dirigible, a load-engaging member mounted on said main frame for rotation in a substantially horizontal plane, an operator's platform movable as a unit with said load-engaging member, a steering member carried by said platform, means operably connected with said steering member and with the dirigible wheel to steer the vehicle, said means including a floating member, means to control said floating member, including a gear carried by said member and coacting with a pair of gears, one gear of said pair being fixed relative to said platform and the other gear being fixed relative to said main frame, whereby said floating member will be controlled to compensate for relative movement between the main frame and said platform, thus permitting the steering member to remain fixed relative to the platform during the relative movement between the main frame and the platform.

5. In a road vehicle, a main frame, supporting wheels therefor, at least one of said wheels being dirigible, an operator's platform and a load-engaging member mounted on said main frame for rotation in a substantially horizontal plane as a unit relative to the main frame, a steering wheel carried by said platform, means operably connected with said steering member and with the dirigible wheel to steer the vehicle, said means including a floating member, means to control said floating member, including a gear carried by said member and coacting with a pair of gears, one gear of said pair being fixed relative to said platform and the other gear being fixed relative to said main frame, whereby said floating member will be controlled to compensate for relative movement between the main frame and said platform, thus permitting the steering member to retain fixed relative to the platform during the relative movement between the main frame and the platform.

6. In an industrial truck, a main frame, supporting wheels therefor, at least one of said wheels being dirigible, a load-engaging member and operator's platform mounted on said main frame for rotation as a unit about a substantially vertical axis relative to such frame, a manually operable steering wheel rotatably mounted on said platform, a bevelled gear rotatably journalled on said platform in axial alignment with the axis of rotation thereof and operably connected with said steering wheel, a second bevelled gear rotatably journalled on said main frame in axial alignment with said axis of rotation and operably connected with the dirigible wheel, a third bevelled gear mounted between and coacting with said first-named gears to transmit the movement of one of such gears to the other of such gears consequently upon the operation of said steering member, said last-named means having its axis extending in a direction normal to the axis of the first-named gears, and means to positively rotate said last-named gear about the axis of rotation of said platform consequent upon relative movement between the platform and the main frame to compensate for such movement, whereby the first and second-named gears may remain fixed relative to the platform and main frame respectively, said means comprising a bevelled gear member fixed to said platform, and having its axis in alignment with the axis of rotation of said platform, a second bevelled gear member fixed to said main frame and having its axis in alignment with the axis of said last-mentioned gear and a third bevelled gear member rotatably having its axis extending normal to the axes of the last-mentioned bevelled gear members, and coacting with both of such gear members, and a common shaft connecting the gears whose axes are normal to the axis of rotation of said platform.

7. In an industrial truck, a main frame, a plurality of dirigible supporting wheels therefor, a load-engaging member and operator's platform mounted on said main frame for rotation about a relatively vertical axis, a manually rotatable steering wheel mounted on said platform, a bevelled gear rotatably journalled on said platform in axial alignment with the axis of rotation thereof and operably connected with said steering wheel, a second bevelled gear rotatably journalled on said main frame in axial alignment with said axis of rotation and operably connected with said dirigible wheels to steer the vehicle, a third bevelled gear mounted between and coacting with said first-named gears to transmit the movement of one of such gears to the other of such gears consequent upon the operation of said steering member and having its axis extending in a direction normal to the axis of such first-named gears, a rotatable shaft in axial alignment with the first-named gears and providing a movable support on which said third gear is rotatably mounted, and means to positively rotate said support consequent upon relative movement between the platform and the main frame to compensate for such movement, whereby the first and second-named gears may remain fixed relative to the platform and main frame respectively, said means comprising a bevelled gear member fixed to said platform, and having its axis in alignment with the axis of rotation of said platform, and a bevelled gear member fixed to said main frame and having its axis in alignment with the axis of said last-mentioned gear and a third bevelled gear member rotatably mounted on said support with its axis extending normal to the axes of the last-mentioned bevelled gear members and coacting with both of such gear members.

8. A steering mechanism for an industrial truck having a main frame and supporting wheels therefor, at least one of said wheels being dirigible, a load-engaging member and operator's platform mounted on said main frame for rotation on a substantially horizontal plane relative to such frame, said steering mechanism including a manually operable steering wheel rotatably carried by the platform, a housing secured to said platform, a bevelled gear rotatably journalled in said housing in axial alignment with the axis of rotation thereof, gearing connecting said bevelled gear with said steering wheel, a sleeve secured to said main frame, a bevelled gear rotatably journalled on said sleeve in axial alignment with said axis of rotation and operably connected with the dirigible wheels to steer the vehicle, a third bevelled gear mounted between and coacting with said first-named gears to transmit the movement of one of such gears to the other of such gears consequent upon the operation of said steering member and having its axis extending in a direction normal to the axis of such first-named gears, a hollow rotatable shaft in axial alignment with the first-named gears and providing a movable support on which said third gear is rotatably mounted, a bevelled gear member fixed to said housing and having its axis in alignment with the axis of rotation of said platform, and a second bevelled gear member fixed to said sleeve and having its axis in alignment with the axis of said last-mentioned gear member and a third bevelled gear member rotatably mounted on said support with its axis extending normal to the axes of the last-mentioned bevelled gear members, and coacting with both of such gear members.

SHELDON K. TOWSON.

CERTIFICATE OF CORRECTION.

Patent No. 2,202,676. May 28, 1940.

SHELDON K. TOWSON.

It is hereby certified that error appears in the printed specification of the above numbered patent requiring correction as follows: Page 5, first column, line 9, claim 5, for the word "retain" read --remain--; and that the said Letters Patent should be read with this correction therein that the same may conform to the record of the case in the Patent Office.

Signed and sealed this 3rd day of December, A. D. 1940.

(Seal)

Henry Van Arsdale,
Acting Commissioner of Patents.